(No Model.)
F. PAYZANT.
PROCESS OF AND APPARATUS FOR EXTRACTING OIL FROM FISH LIVER AND BLUBBER.
No. 288,106. Patented Nov. 6, 1883.
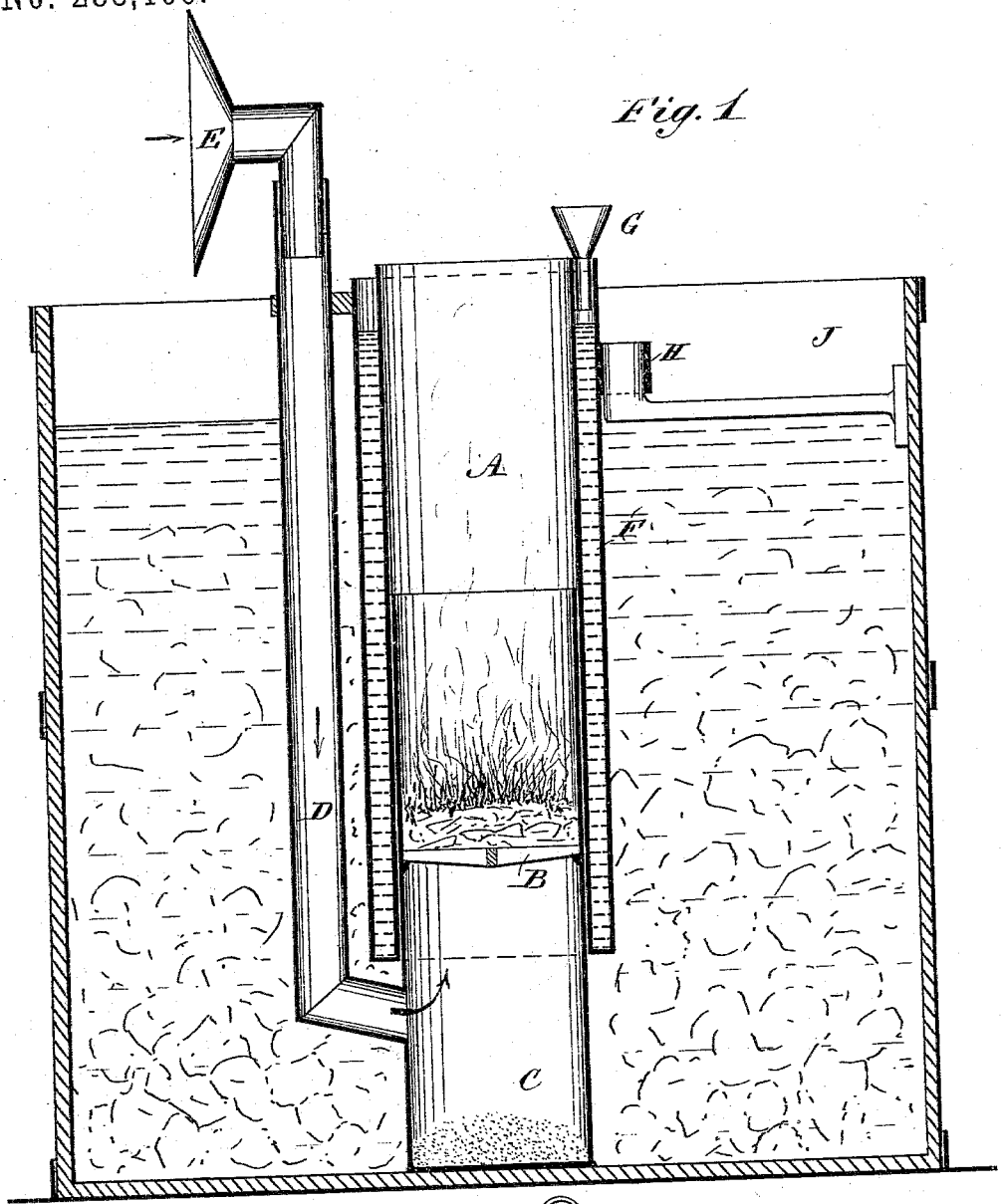
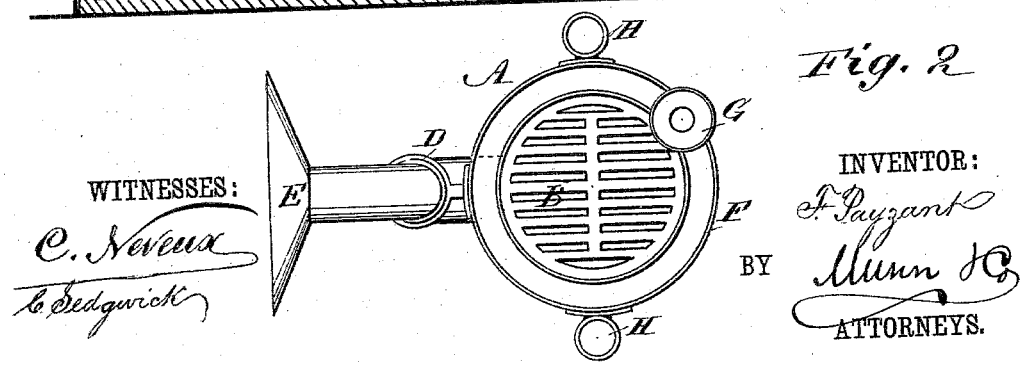

United States Patent Office.

FREEMAN PAYZANT, OF LOCKE PORT, NOVA SCOTIA, CANADA.

PROCESS OF AND APPARATUS FOR EXTRACTING OIL FROM FISH LIVER AND BLUBBER.

SPECIFICATION forming part of Letters Patent No. 288,106, dated November 6, 1883.

Application filed July 21, 1883. (No model.) Patented in Canada June 21, 1883, No. 17,050.

*To all whom it may concern:*

Be it known that I, FREEMAN PAYZANT, of Locke Port, in the county of Shelburne, Province of Nova Scotia, and Dominion of Canada, have invented a new and Improved Process of and Apparatus for Extracting Oil from Fish Livers and Blubber, of which the following is a full, clear, and exact description.

The object of my invention is to provide a new and improved device for extracting oil from fish livers and blubber.

The invention consists in a furnace provided with a water-jacket, and with a pipe for conducting air into the furnace below the grate, which pipe is provided at its upper end with an adjustable hood for catching the air. The furnace is placed into a tank or vat containing fish livers or blubber, and the heated water heats the livers and blubber, whereby the oil will be extracted and will rise to the surface, the livers and blubber sinking to the bottom.

Reference is to be had to the accompanying drawings, forming a part of this specification, in which similar letters of reference indicate corresponding parts in both the figures.

Figure 1 is a longitudinal sectional elevation of my improved oil-extractor, showing the manner in which it is used. Fig. 2 is a plan view of the furnace as removed from the tank.

A cylindrical furnace, A, is provided with a grate, B, below which an ash-pit, C, is formed. Air is conducted to the fire by a pipe entering the furnace below the grate, and having its upper end, which is above the top of the furnace, provided with an adjustable hood, E, for catching and conducting the air into the pipe D. The furnace is surrounded by a water-jacket, F, which can be filled by means of a funnel, G. The furnace is provided with handles H, for moving it about. The furnace is placed upright in a tank, vat, or tub, J, containing the livers or blubber, and is held in place by a suitable arm or other fastening passed through or secured to one of the handles.

The extractor is used as follows: The jacket F is filled with water, and a fire is started in the furnace, which fire heats the water. The hot water will take the oil from the liver or blubber, and the oil will rise to the surface, the livers or blubber sinking to the bottom of the vessel J, and the oil is skimmed off or removed by dippers, or is drawn off by means of a suitable faucet. The heat must be regular, and the jacket must be kept well filled with water, so that the direct heat from the fire cannot dry out the liver and blubber. The extractor is to be used on board of fishing-vessels or on shore, and can be made of various sizes.

I do not abandon or dedicate to the public any patentable features set forth herein and not hereinafter claimed, but reserve the right to claim the same either in a reissue of any patent that may be granted upon this application or in other applications for Letters Patent that I may make.

I am aware that the method of extracting cod-liver oil which consists in confining a mass of the livers between the upright walls of a cylindrical furnace and the walls of a vessel containing water and surrounding said furnace, and subjecting the livers to the action of heat from a fire built within said furnace, the cylinder of which is provided with a lining arranged with an air-space between it and the cylinder, and the latter having a grate and an air-supply pipe conveying air under the grate, and provided with an adjustable hood at its upper end, is old, and I therefore lay no claim, broadly, to such invention in which the air in the air-space is liable to become highly heated, thus burning or cooking the livers, and rendering the oil dark. By the employment of a water-jacket surrounding the cylindrical furnace in my invention the temperature thereof cannot be raised beyond 212° Fahrenheit, and the burning or cooking of the livers and the darkening of the oil is prevented, and at the same time the apparatus can be used to extract the oil while the livers are fresh, while the extractor disclaimed can only be used (with good results) after the heat of the sun has decomposed the livers, which operation requires some days, and while this slow decomposition is progressing the oil becomes dark in consequence of decay.

Having thus described my invention, I claim as new and desire to secure by Letters Patent—

1. The method herein described of preventing the discoloration and injury of the oil, which consists in interposing a stratum of water between the oil-yielding substance and the furnace, substantially as described, and for the purpose set forth.

2. The combination, with the oil-holding receptacle, of a water-jacketed furnace, substantially as shown and described.

3. The combination, with the furnace A B C, provided with an air-pipe, D, and adapted to be supported in a tank, of the water-jacket to F, surrounding the furnace and extending from below the grate nearly to the upper end of the furnace.

FREEMAN PAYZANT.

Witnesses:
 LEWIS CUNNINGHAM,
 WINSLOW MACMILLAN.